(12) United States Patent
Rivas

(10) Patent No.: US 11,928,259 B2
(45) Date of Patent: Mar. 12, 2024

(54) CONTROLLING HAPTIC FEEDBACK BASED ON PROXIMITY OF CONTACT TO SENSOR

(71) Applicant: Google LLC, Mountain View, CA (US)

(72) Inventor: Diego Rivas, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/905,445

(22) PCT Filed: Mar. 12, 2020

(86) PCT No.: PCT/US2020/022419
§ 371 (c)(1),
(2) Date: Sep. 1, 2022

(87) PCT Pub. No.: WO2021/183132
PCT Pub. Date: Sep. 16, 2021

(65) Prior Publication Data
US 2023/0128291 A1    Apr. 27, 2023

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 9,063,571 B2 | 6/2015 | Birnbaum et al. | |
| 9,733,746 B2 | 8/2017 | Colgate et al. | |
| 2010/0004033 A1* | 1/2010 | Choe ...................... | H04M 1/724 |
| | | | 455/567 |
| 2010/0156818 A1 | 6/2010 | Burrough et al. | |
| 2015/0077324 A1* | 3/2015 | Birnbaum ............... | G06F 3/016 |
| | | | 345/156 |
| 2015/0293592 A1 | 10/2015 | Cheong et al. | |
| 2017/0011210 A1* | 1/2017 | Cheong .................. | A61B 5/681 |

(Continued)

FOREIGN PATENT DOCUMENTS

EP    3422156 A1    1/2019

OTHER PUBLICATIONS

International Search Report and Written Opinion for PCT Application PCT/US2020/022419, dated Nov. 18, 2020, 13 pages.

(Continued)

*Primary Examiner* — Carl Adams
(74) *Attorney, Agent, or Firm* — Shumaker & Sieffert, P.A.

(57) ABSTRACT

A method can include determining that a measured distance, of an object in contact with a touchscreen, from a sensor included in the touchscreen, is less than or equal to a first distance and equal to or greater than a second distance, based on determining that the measured distance of the object from the sensor is less than or equal to the first distance and equal to or greater than the second distance, providing haptic feedback as a function of the measured distance, the haptic feedback being greater for smaller measured distances; determining that the measured distance is less than the second distance; and in response to determining that the measured distance is less than the second distance, decreasing the haptic feedback.

20 Claims, 9 Drawing Sheets

(56) References Cited

U.S. PATENT DOCUMENTS

| | | |
|---|---|---|
| 2018/0224990 A1 | 8/2018 | Shim et al. |
| 2019/0087003 A1 | 3/2019 | Medlen et al. |
| 2019/0171293 A1 | 6/2019 | Cruz-Hernandez et al. |
| 2019/0197285 A1 | 6/2019 | Shim et al. |
| 2020/0301482 A1* | 9/2020 | Heo .................. G06F 1/1601 |
| 2021/0181847 A1* | 6/2021 | Noh .................. G06F 3/0412 |

OTHER PUBLICATIONS

Communication pursuant to Rule 161(1) and 162 EPC from counterpart European Application No. 20718027.4 dated Sep. 16, 2022, 3 pages.
International Preliminary Report on Patentability from International Application No. PCT/US2020/022419 dated Sep. 6, 2022, 9 pages.
Response to Communication Pursuant to Rules 161(1) and 162 EPC dated Sep. 16, 2022, from counterpart European Application No. 20718027.4, filed Feb. 23, 2023, 6 pages.

* cited by examiner

CONTROLLING HAPTIC FEEDBACK BASED ON PROXIMITY OF CONTACT TO SENSOR

CROSS-REFERENCE TO RELATED APPLICATION

This application is a 35 U.S.C. § 371 National Stage Entry Application from PCT/US2020/022419, filed on Mar. 12, 2020, entitled, "CONTROLLING HAPTIC FEEDBACK BASED ON PROXIMITY OF CONTACT TO SENSOR," the disclosure of which is incorporated herein by reference in its entirety.

TECHNICAL FIELD

This description relates to computing devices with touch sensors.

BACKGROUND

Computing devices, such as mobile computing devices including smartphones, can include input sensors including biometric authentication features such as fingerprint sensors. In the example of a fingerprint sensor, the user's finger can obscure the user's view of the fingerprint sensor, making it difficult for the user to place the user's finger in the correct location on the fingerprint sensor.

SUMMARY

According to an example, a method can include determining that a measured distance, of an object in contact with a touchscreen, from a sensor included in the touchscreen, is less than or equal to a first distance and equal to or greater than a second distance, based on determining that the measured distance of the object from the sensor is less than or equal to the first distance and equal to or greater than the second distance, providing haptic feedback as a function of the measured distance, the haptic feedback being greater for smaller measured distances; determining that the measured distance is less than the second distance; and in response to determining that the measured distance is less than the second distance, decreasing the haptic feedback.

According to an example, a method can include detecting a contact on a touchscreen, in response to detecting the contact on the touchscreen, determining whether the contact is located in a first zone on the touchscreen, a second zone on the touchscreen, a third zone on the touchscreen, or a fourth zone on the touchscreen, the first zone at least partially overlapping a fingerprint sensor included in the touchscreen, the second zone surrounding the first zone, the third zone surrounding the second zone, and the fourth zone surrounding the third zone, and determining a haptic feedback level to generate based on the determined location of the contact, the haptic feedback level being a first haptic feedback level when the contact is in the first zone, a second level when the contact is in the second zone, a third level when the contact is in the third zone, and a fourth level when the contact is in the fourth zone, the second haptic feedback level being greater than the first haptic feedback level, the third haptic feedback level being less than the second haptic feedback level and greater than the first haptic feedback level, and the fourth haptic feedback level being less than the third haptic feedback level.

According to an example, a computing device can include a display, a processor, and a housing. The display can include a touch sensor layer, a fingerprint sensor, and a haptics layer. The processor can be configured to determine that a measured distance, from the fingerprint sensor, of an object detected by the touch sensor layer, is less than or equal to a first distance and equal to or greater than a second distance, based on determining that the measured distance of the object is less than or equal to the first distance and equal to or greater than the second distance, cause the haptics layer to generate a frictional force as a function of the measured distance, the frictional force being greater for smaller measured distances, determine that the measured distance is less than the second distance, and based on determining that the measured distance is less than the second distance, cause the haptics layer to reduce the frictional force. The housing can enclose the display and the processor.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Computing devices can include input sensors including biometric authentication features, such as fingerprint sensors. To maximize the viewable area of a display included in the computing device, a fingerprint sensor can be included in the display. To assist a user in placing the user's finger over the fingerprint sensor, the computing device can provide haptic feedback on the display based on the proximity of the user's finger to the fingerprint sensor. For example, the computing device can control the haptic feedback by increasing the haptic feedback as the user's finger moves closer to the fingerprint sensor, until the user's finger is on or over the fingerprint sensor, at which point the computing device can reduce and/or stop the haptic feedback.

Figure 1A:
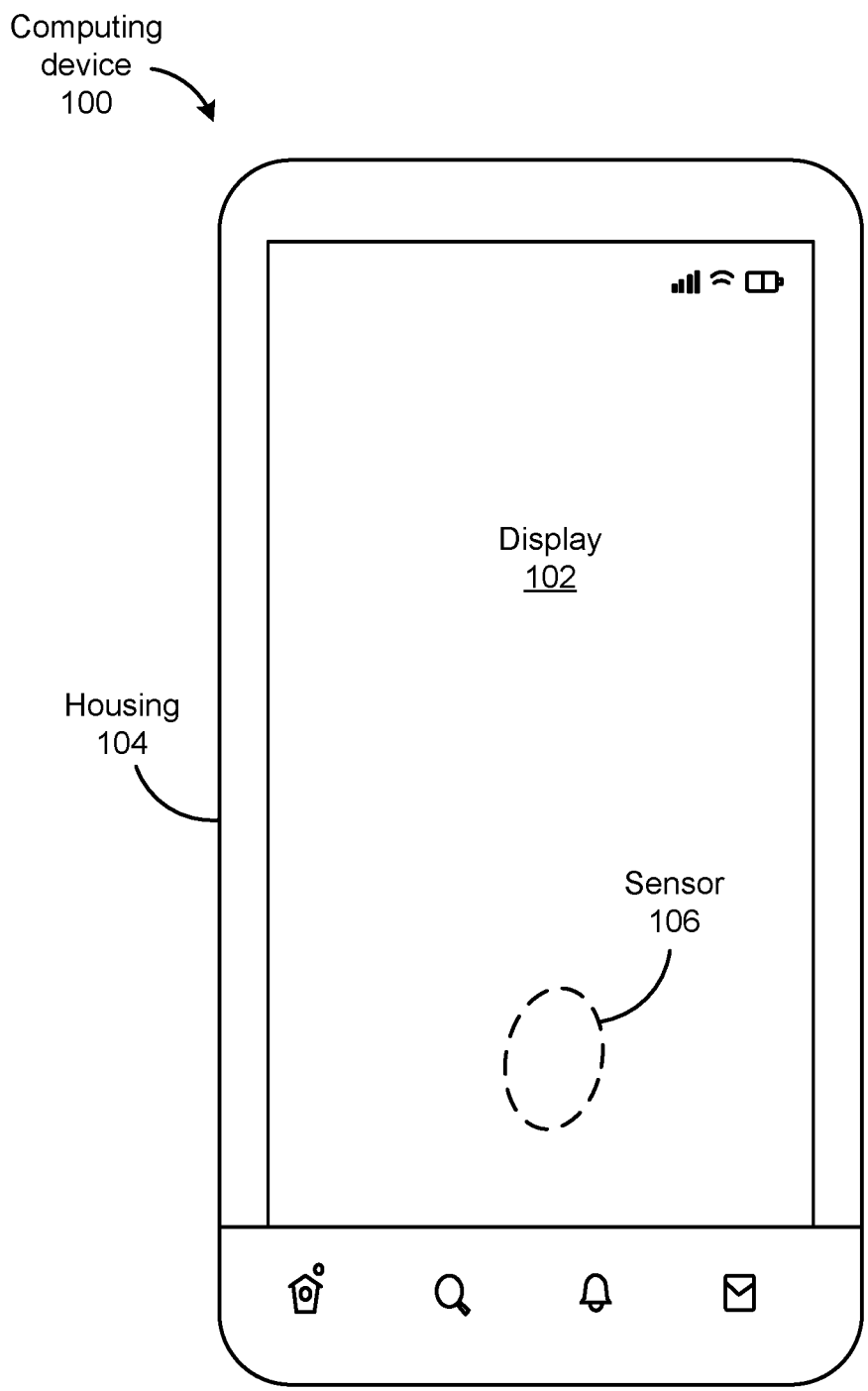
FIG. 1A is a top view of a computing device according to an example implementation.

FIG. 1A is a top view of a computing device 100 according to an example implementation. The computing device 100 can include a display 102 surrounded by and/or supported by a housing 104. The display 102 can present graphical output to a user. In some examples, the display 102 can include a touchscreen display that receives touch input from the user.

The computing device 100 can include a sensor 106. The computing device 100 can include the sensor 106 inside and/or below the display 102. The sensor 106 can include a biometric authentication device such as a fingerprint sensor or other device that authenticates a user based on information detected from a portion of the user's body. In some examples, the sensor 106 can include an ultrasonic sensor that can determine features of the user's fingerprint based on ultrasonic feedback. In some examples, the sensor 106 can include an optical sensor that can determine features of the user's fingerprint based on optical feedback.

Figure 1B:
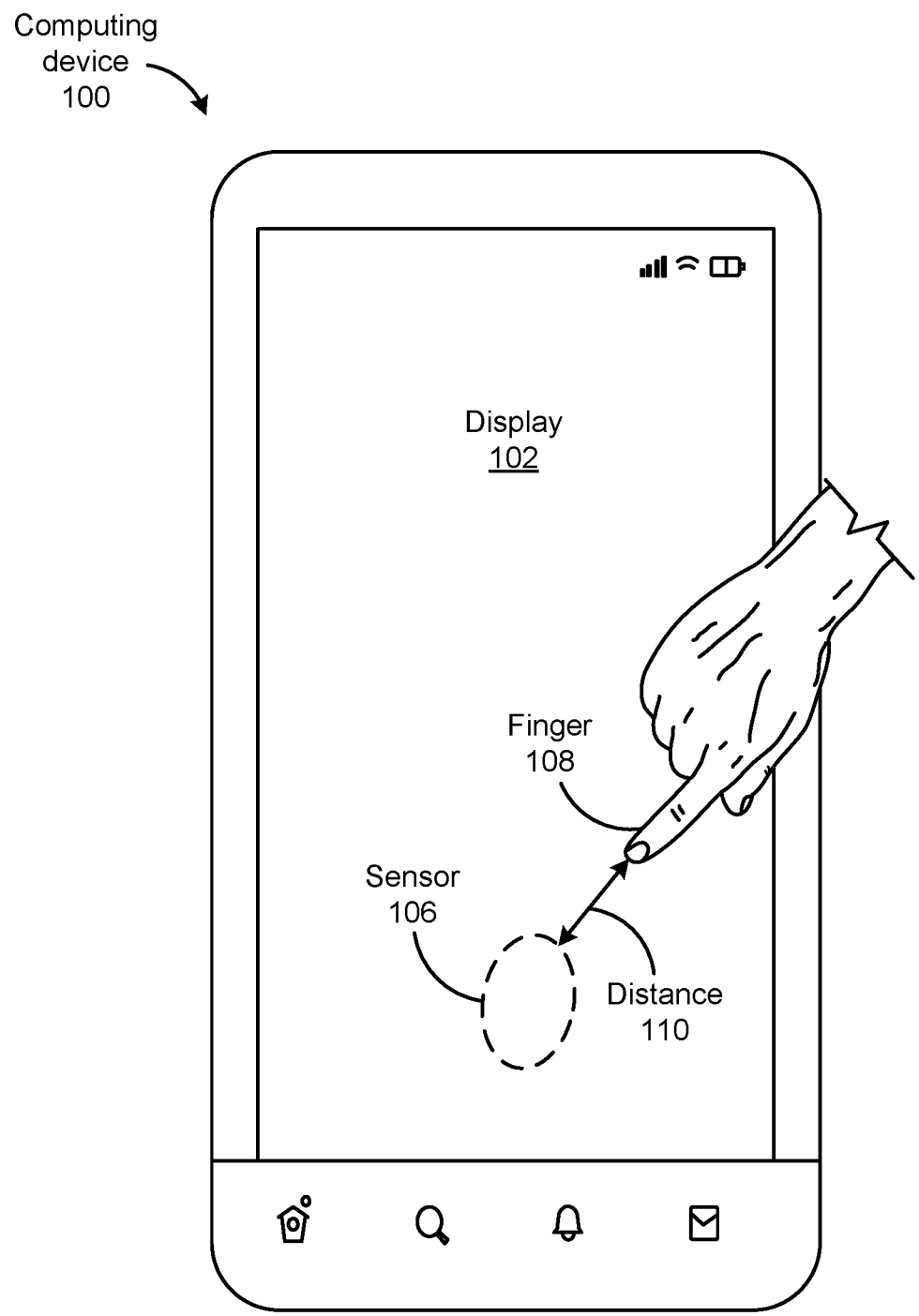
FIG. 1B is a top view of the computing device with a finger contacting a display of the computing device according to an example implementation.

FIG. 1B is a top view of the computing device 100 with a finger 108 contacting the display 102 of the computing device 100 according to an example implementation. The user can place the user's finger 108 on the display 102. The computing device 100 can determine a location of the finger 108 on the display 102. The computing device 100 can determine a location of the finger 108 on the display 102 based, for example, on capacitive sensors or resistive sensors included in the display 102.

The computing device 100 can determine and/or measure a distance 110 of the finger 108 from the sensor 106. The computing device 100 can determine and/or measure a measured distance 110 of the finger 108 (or other object contacting the display 102) from one or more predetermined locations on the display 102, which can correspond to a center of the sensor 106 or an outer portion of the sensor 106, as non-limiting examples. In some examples, the computing device 100 can determine the distance 110 as a greater of a horizontal distance or a vertical distance of the object such as the finger 108 from the sensor 106.

The computing device 100 can control haptic feedback, such as friction or vibration, based on the measured distance 110 of the finger 108 from the sensor 106. In some examples, the computing device 100 can provide no haptic feedback when the measured distance 110 is greater than a first distance. In some examples, the computing device 100 can provide haptic feedback, such as friction, when the measured distance is less than or equal to the first distance and greater than or equal to a second distance. In some examples, the computing device 100 can increase the haptic feedback, such as friction, as the measured distance 110 decreases, until the measured distance becomes equal to or less than the second distance. When the measured distance 110 becomes equal to or less than the second distance, the computing device 100 can reduce the haptic feedback, such as friction, and/or stop providing the haptic feedback. The increase and then decrease in haptic feedback can give the user the feeling of moving the user's finger up a slope until falling into the location of the sensor 106, allowing the user to place the user's finger 108 onto the location of the sensor 106 without visual cues.

Figure 1C:
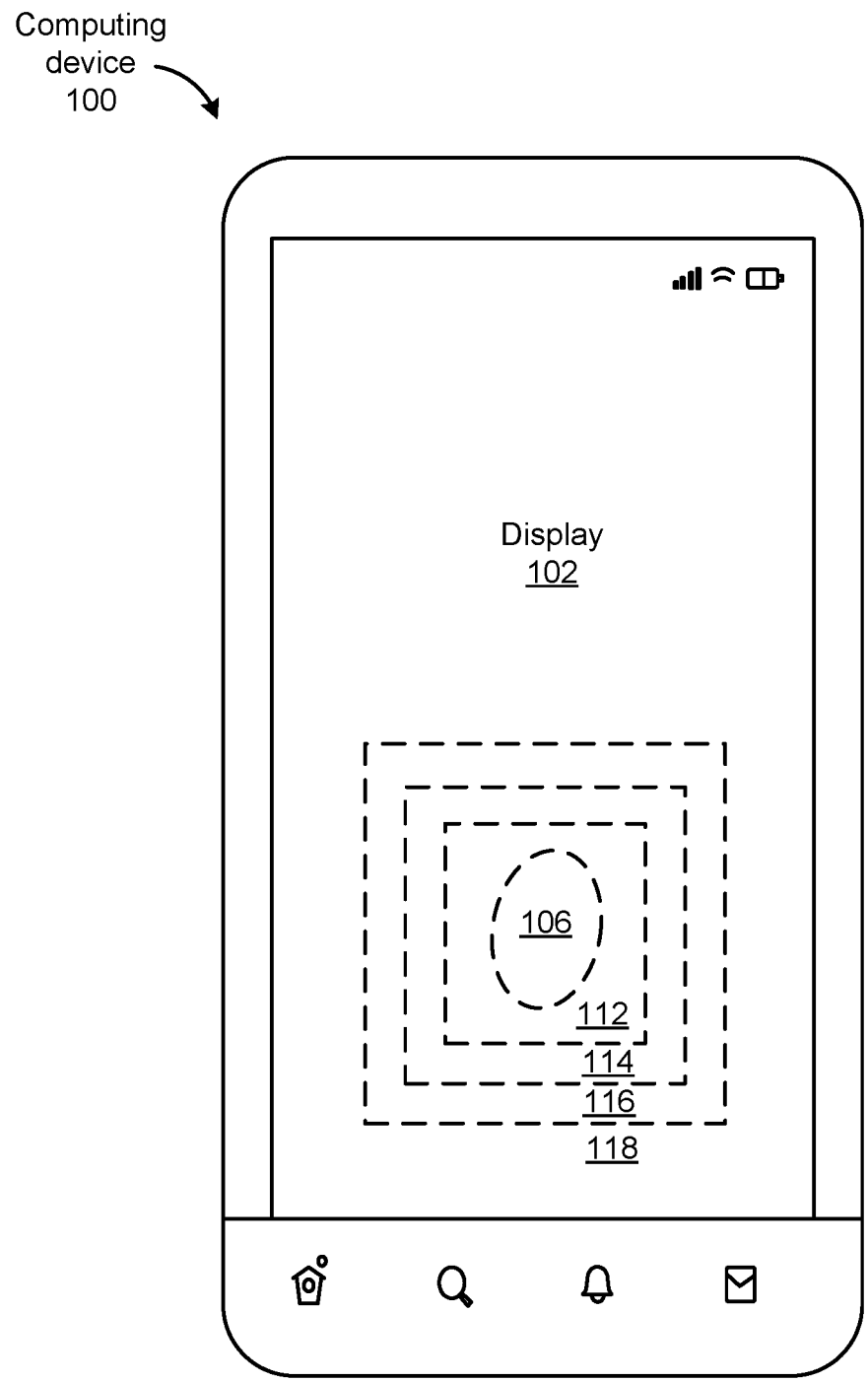
FIG. 1C is a top view of the computing device showing zones around a sensor included in the display according to an example implementation.

FIG. 1C is a top view of the computing device 100 showing zones 112, 114, 116, 118 around the sensor 106 included in the display 102 according to an example implementation. While four zones 112, 114, 116, 118 around the sensor 106 are shown in FIG. 1C, the computing device 100 can recognize any number of zones around the sensor 106. In some examples, the zones 112, 114, 116, 118 can represent measured distances of a contact, such as the finger 108 shown in FIG. 1B, from the sensor 106, such as the distance 110 of the finger 108 from the sensor 106 shown in FIG. 1B.

In some examples, the computing device 100 can determine whether a contact, such as the finger 108 shown in FIG. 1B, is in a first zone 112, a second zone 114, a third zone 116, or a fourth zone 118. The first zone 112 can at least partially overlap the sensor 106. The first zone 112 can at least partially overlap the sensor 106 by completely covering the sensor 106, by being completely contained within an area above the sensor 106, or by having a portion, less than all of, the first zone 112 overlap a portion, less than all of, the sensor 106. The second zone 114 can surround the first zone 112. The third zone 116 can surround the second zone 114. The fourth zone 118 can surround the third zone 116. While the zones 112, 114, 116, 118 shown in FIG. 1C are rectangular shaped, this is merely and example. The zones 112, 114, 116, 118 can have any shape, such as circles, ellipses, or ovals.

The computing device 100 can determine a haptic feedback level to generate based on which zone 112, 114, 116, 118 the computing device 100 determines that the object or contact is located in. In some examples, the computing device 100 can determine to generate a first level of haptic feedback when the contact is in the first zone 112, a second level of haptic feedback when the contact is in the second zone 114, a third level of haptic feedback when the contact is in the third zone 116, and/or a fourth level of haptic feedback when the contact is in the fourth zone 118. The haptic feedback can include, for example, vibration or friction. In some examples, the second level of haptic feedback can be greater than the first level of haptic feedback. In some examples, the third level of haptic feedback can be less than the second level of haptic feedback, and/or the second level of haptic feedback can be greater than the third level of haptic feedback. In some examples, the fourth level of haptic feedback is less than the third level of haptic feedback. In some examples, the first level of haptic feedback is zero, and/or the computing device 100 generates no haptic feedback and/or stops providing haptic feedback when the contact is in the first zone 112. In some examples, the fourth level of haptic feedback is zero, and/or the computing device 100 generates no haptic feedback and/or stops providing haptic feedback when the contact is in the fourth zone 118. The increase and then decrease in haptic feedback can give the user the feeling of moving the user's finger up a slope while moving from the fourth zone 118 into the third zone 116 and then the second zone 114 until falling into the first zone 112, allowing the user to place the user's finger 108 (not shown in FIG. 1C) onto the first zone 112 and/or location of the sensor 106 without visual cues.

Figure 2:
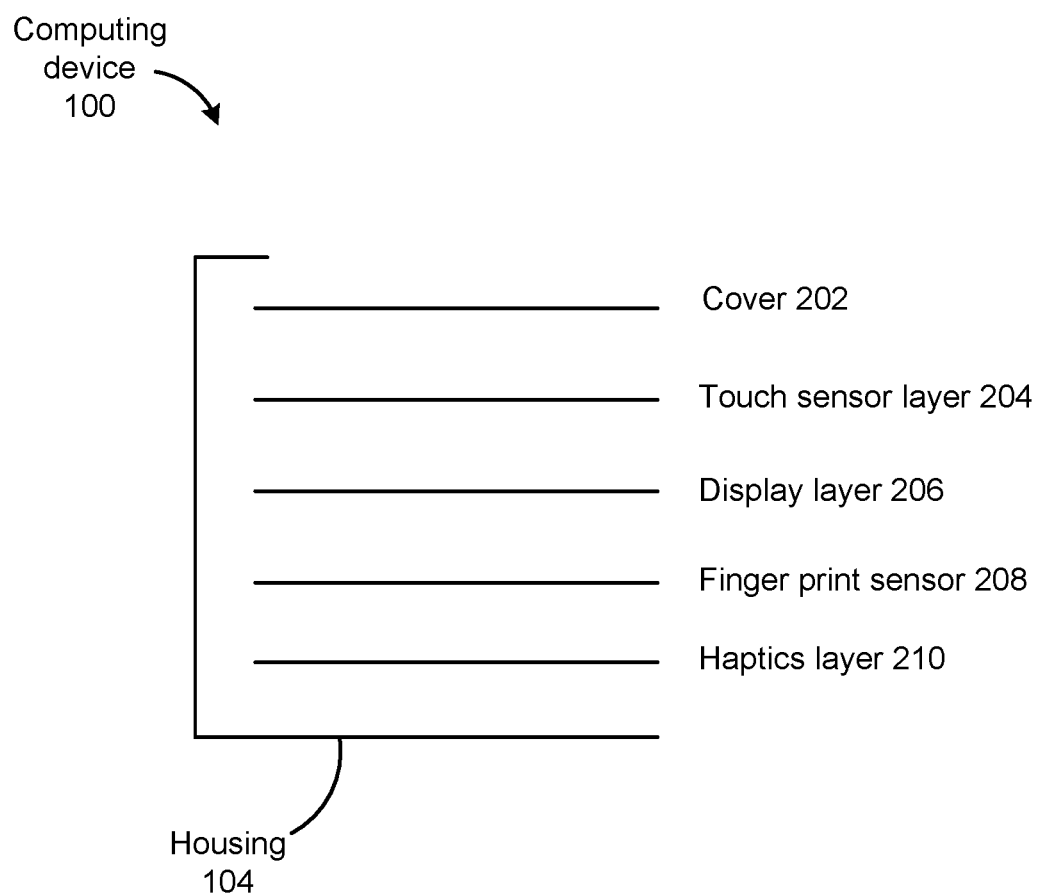
FIG. 2 is an exploded cross-sectional view of the computing device according to an example implementation.

FIG. 2 is an exploded cross-sectional view of the computing device 100 according to an example implementation. What can be considered the display 102 and/or touchscreen can comprise and/or include multiple layers. The display 102 can include, for example, a cover 202, a touch sensor layer 204, a display layer 206, a sensor such as a fingerprint sensor 208, and/or a haptics layer 210. The cover 202, the touch sensor layer 204, the display layer 206, the sensor such as the fingerprint sensor 208, and/or the haptics layer 210 can be enclosed and/or supported by the housing 104. In some examples, the housing 104 can also enclose and/or support components described below, such as a processor 410, memory 412, and/or input/output node 414.

The cover 202 can include a transparent material such as plastic or glass. The cover 202 can protect other components of the computing device 100. The cover 202 can be contacted by objects, such as a finger 108, when the computing device 100 receives touch input.

The touch sensor layer 204 can receive and/or process touch input. The touch sensor layer 204 can recognize a contact on the cover 202, receive and/or process input to determine a location of the contact on the cover 202, and/or receive and/or process input to determine movement of the contact on the cover 202. The touch sensor layer 204 can be adjacent to and/or under the cover 202. The touch sensor layer 204 can include, for example, capacitive touch sensors and/or resistive touch sensors.

The display layer 206 can generate graphical and/or visual output. The display layer 206 can be adjacent to and/or under the touch sensor layer 204. The display layer 206 can include a liquid crystal display (LCD), thin-film transistor (TFT) LCD, in-plane switching (IPS) LCD, organic light-emitting diode (OLED) display, or active matric OLED (AMOLED), as non-limiting examples.

The sensor, such as a fingerprint sensor 208, can receive and/or process input for biometric authentication, such as receiving and/or processing an image of the user's finger 108. The sensor, such as the fingerprint sensor 208, can be adjacent to and/or below the display layer 206. The sensor such as the fingerprint sensor 208 can include an ultrasonic sensor and/or an optical sensor.

The haptics layer 210 can generate haptic feedback based on proximity of the contact, such as the finger 108, to the sensor 106 such as the fingerprint sensor 208. The haptics layer 210 can be adjacent to and/or under the sensor such as the fingerprint sensor 208. In some examples, the haptics layer 210 can include actuators, such as piezoelectric actuators, that generate vibrations. In some examples, the actuators can be disposed within only a portion of the display, such as within a predetermined boundary around the sensor 106. In some examples, the haptics layer 210 can include an electrode grid that increases friction experienced by the user moving the user's finger 108 along the cover by generating an electromagnetic field that attracts the user's finger toward the cover 202.

In an example in which the haptics layer 210 includes an electrostatic array of nodes, the haptics layer 210 can increase haptic feedback and/or a haptic response by increasing a frictional force experienced by the object such as the finger 108 in response to a processor 410 (shown in FIG. 4) increasing an amplitude and/or frequency of a signal sent to the electrostatic array. In the example in which the haptics layer 210 includes the electrostatic array of nodes, the haptics layer 210 can decrease the haptic feedback and/or haptic response by decreasing frictional force experienced by the object in response to the processor 410 decreasing the amplitude and/or frequency of the signal sent to the electrostatic array. In an example in which the haptics layer 210 includes one or more actuators, such as piezoelectric actuators, the haptics layer 210 can increase or decrease the haptic feedback and/or haptic response by increasing or decreasing vibration generated by the actuators included in the haptics layer 210 in response to instruction from the processor 410.

Figure 3A:
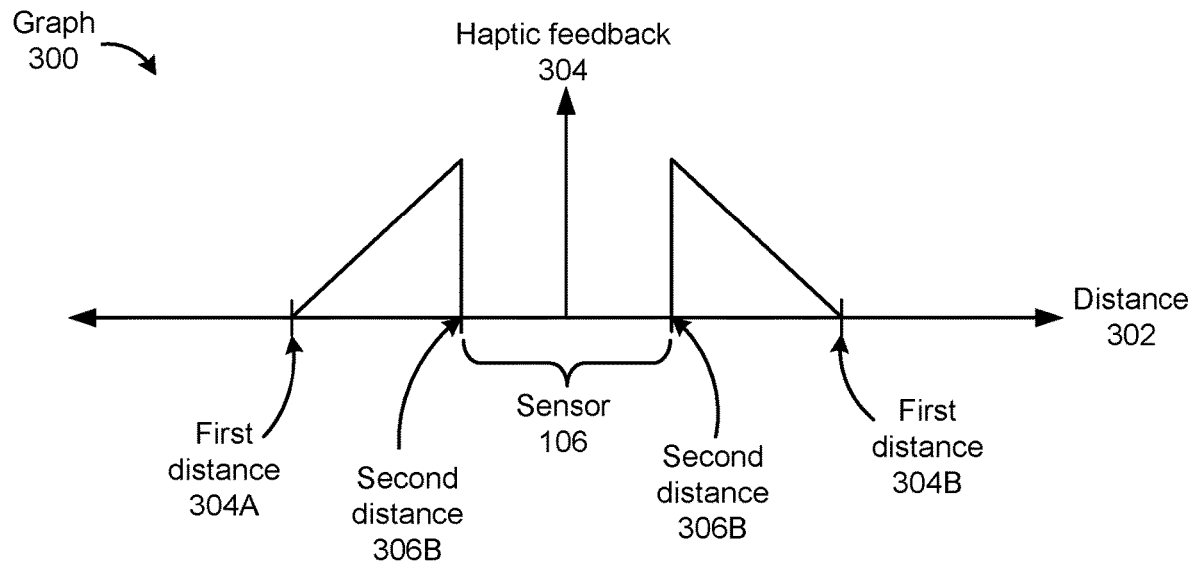
FIG. 3A is a graph showing haptic feedback generated by the computing device as a function of distance of a contact from a sensor according to an example implementation.

FIG. 3A is a graph 300 showing haptic feedback 304 generated by the computing device 100 as a function of distance 302 of a contact from a sensor 106 according to an example implementation. The contact can include the finger 108 shown in FIG. 1B, The distance 302 can include the measured distance 110 shown in FIG. 1B. While the graphic of FIG. 3A shows the distance 302 in one dimension, the location of the contact on the display 102 can be represented in two dimensions. In some examples, the distance 302 can be the longer and/or greater of a measured vertical distance and a measured horizontal distance.

When the measured distance 302 is less than or equal to a first distance 306A, 306B, the computing device 100 can increase haptic feedback 304 in response to the distance 302 decreasing in absolute value, representing the contact (such as the finger 108) moving closer to the sensor 106, until the distance becomes equal to or less than a second distance 308A, 308B. The haptic feedback 304 can represent, for example, a magnitude of vibrations generated by actuators or friction caused by an electrostatic grid. When the measured distance 302 is less than or equal to the second distance 308A, 308B, the computing device 100 can reduce and/or stop the haptic feedback 304. The second distance 308A, 308B can be greater than zero, representing an area around and/or above the sensor 106.

Figure 3B:
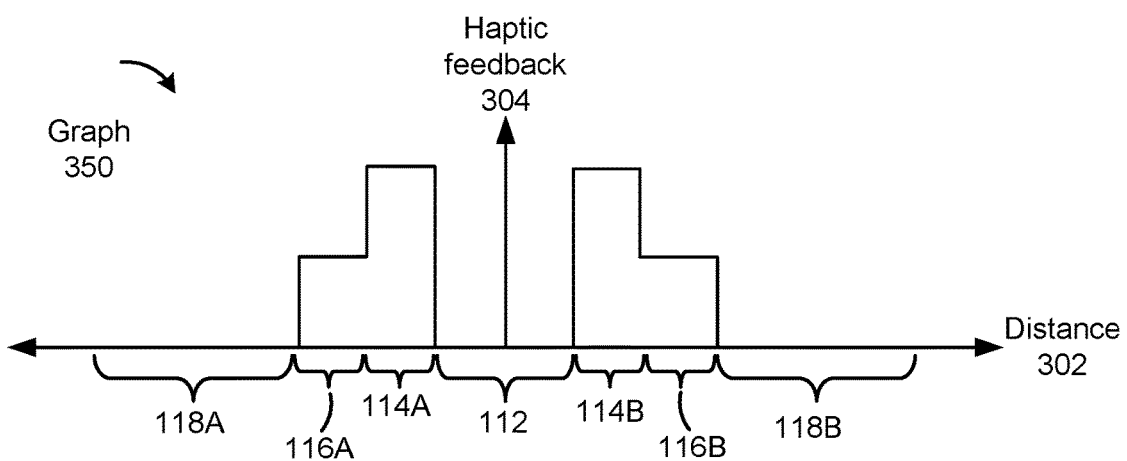
FIG. 3B is a graph showing haptic feedback generated by the computing device as a function of distance of a contact from a sensor according to another example implementation.

In the example shown in FIG. 3A, the haptic feedback 304 is a function of the measured distance 302. In the example shown in FIG. 3A, when the measured distance 302 is between the first distance 306A, 308B and the second distance 308A, 308B, the haptic feedback 304 is greater for smaller measured distances 302, and/or the haptic feedback 304 is smaller for lesser measured distances 302. While FIG. 3A shows the haptic feedback 304 responding linearly to changes in the distance 302, this is merely an example. In some examples, the haptic feedback 304 can respond exponentially or asymptotically to changes in the distance, or in a stairstep pattern (as shown in the example of FIG. 3B). In some examples, a rate of change of the haptic feedback 304 as a function of the measured distance 302 can be greater when the measured distance 302 is less than the second distance 308A, 308B than when the measured distance 302 is greater than the second distance 308A, 308B, reflecting a rapid decrease in the haptic feedback 304 when the object arrives over the sensor 106. The increase and then reduction of haptic feedback 304 shown in FIG. 3A can give the user the feeling that the user's finger 108 is moving up a slope toward the sensor 106 and then falling down a steeper slope after being positioned over the sensor 106, enabling the user to find the sensor 106 based on touch alone.

FIG. 3B is a graph 350 showing haptic feedback 304 generated by the computing device 100 as a function of distance 302 of the contact from the sensor 106 according to another example implementation. In this example, ranges of distances can correspond to the first zone 112, second zone 114 (which includes ranges of distances 114A, 114B), third zone 116 (which includes ranges of distances 116A, 116B), and fourth zone 118 (which includes ranges of distances 118A, 118B). An outer portion of the third zone 116 and/or inner portion of the fourth zone 118 can correspond to the first distance 306A, 306B. An outer portion of the first zone 112 and/or inner portion of the second zone 114 can correspond to the second distance 308A, 308B.

In the example shown in FIG. 3B, the haptic feedback 304 responds to changes in the distance 302 in discrete levels, with predetermined levels of feedback 304 for each zone 112, 114, 116, 118. While two levels of haptic feedback 304 are shown in FIG. 3B as corresponding to the second and third zones 114, 116, this is merely an example. The computing device 100 can recognize any number of zones on the display 102 and a corresponding number of levels of haptic feedback 304. The increase and then reduction of haptic feedback 304 shown in FIG. 3B can give the user the feeling that the user's finger 108 is moving up a slope toward the sensor 106 and then falling down a steeper slope after being positioned over the sensor 106, enabling the user to find the sensor 106 based on touch alone.

In some examples, the computing device 100 can recognize only three zones. The first zone can correspond to the first zone 112, the second zone can correspond to the second and third zones 114, 116, and the third zone can correspond to the fourth zone 118. In this example, the computing device 100 can provide no haptic feedback when the computing device 100 determines that the contact is in either the first zone or the third zone, and can provide a predetermined level of haptic feedback when the computing device determines that the contact is in the second zone.

Figure 4:
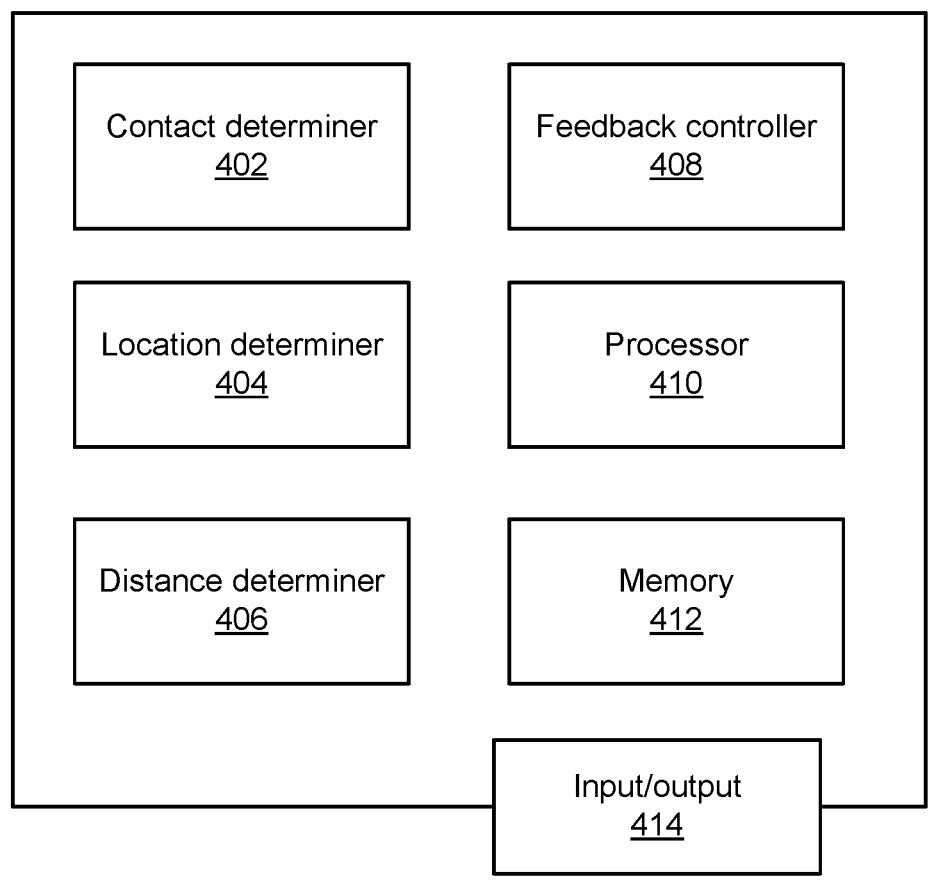
FIG. 4 is a block diagram of the computing device according to an example implementation.

FIG. 4 is a block diagram of the computing device 100 according to an example implementation. The computing device 100 can include a contact determiner 402. The contact determiner 402 can determine when an object, such as the finger 108, has contacted the cover 202 of the display. The contact determiner 402 can determine when the object has contacted the cover 202 based on input received by, and/or processed by, the touch sensor layer 204.

The computing device 100 can include a location determiner 404. The location determiner 404 can determine a location of a contact, such as the finger 108, that the contact determiner 402 determines has contacted the cover 202. The location determiner 402 can determine the location of the object based on input received by, and/or processed by, the touch sensor layer 204.

The computing device 100 can include a distance determiner 406. The distance determiner 406 can determine the distance 110, 302 between the object contacting the display 102 and the sensor 106. The distance determiner 406 can determine the measured distance 110, 302 based on the location determined by the location determiner 404 and one or more predetermined locations which can represent the location(s) of the sensor 106. In examples in which the distance determiner 406 determines multiple distances between the location of contact determined by the location determiner 404 and more than one predetermined location, the distance determiner 406 can determine the distance determiner as the shortest and/or smallest of the multiple distances.

The computing device 100 can include a feedback controller 408. The feedback controller 408 can control the feedback, such as haptic feedback 304 (which can include vibrations and/or friction), based on the location of the contact on the cover 202 of the display 102. In some examples, the feedback controller 408 can control the haptic feedback 304 based on the distance 302, as shown and described with respect to FIGS. 3A and 3B, or in any other manner described herein.

The computing device 100 can include at least one processor 410. The at least one processor 410 can execute instructions, such as instructions stored in at least one memory device 412, to cause the computing device 100 to perform any combination of methods, functions, and/or techniques described herein. The at least one processor 410 can authenticate a user based on biometric information received and/or processed by the sensor 106, such as a fingerprint recognized and/or detected by the sensor 106 in the example in which the sensor 106 is a fingerprint sensor.

The computing device 100 can include at least one memory device 412. The at least one memory device 412 can include a non-transitory computer-readable storage medium. The at least one memory device 412 can store data and instructions thereon that, when executed by at least one processor, such as the processor 410, are configured to cause the computing device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 100 can be configured to perform, alone, or in combination with the computing device 100, any combination of methods, functions, and/or techniques described herein.

The computing device 100 may include at least one input/output node 414. The at least one input/output node 414 can receive and/or send data, such as from and/or to, a server, and/or may receive input and provide output from and to a user. The input and output functions may be combined into a single node, or may be divided into separate input and output nodes. The input/output node 414 can include, for example, a touchscreen display 102 (which can include the cover 202, the touch sensor layer 204, the display layer 206, the fingerprint sensor 208, and/or the haptics layer 210) that receives and processes input and provides haptic output, a speaker, a microphone, one or more buttons, and/or one or more wired or wireless interfaces for communicating with other computing devices.

Figure 5:
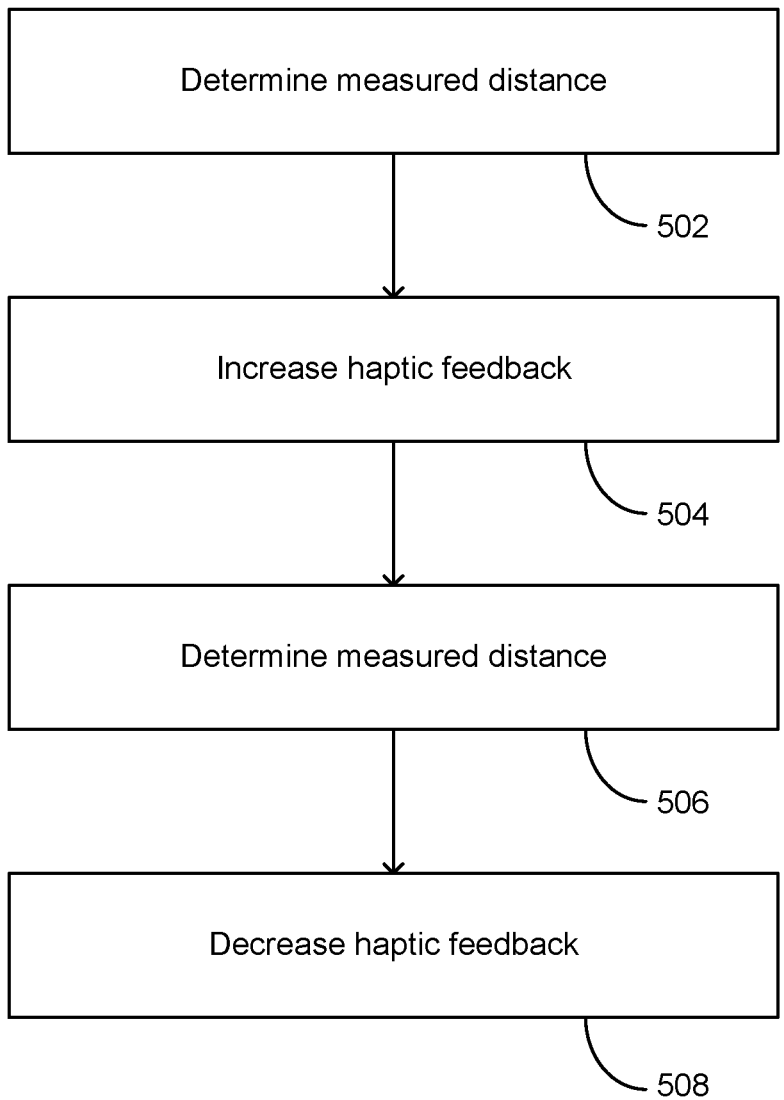
FIG. 5 is a flowchart showing a method performed by the computing device according to an example implementation.

FIG. 5 is a flowchart showing a method performed by the computing device 100 according to an example implementation. A method can include determining a measured distance 110 (502). Determining the measured distance 110 (502 can include determining that a measured distance 110, of an object (such as a finger 108) in contact with a touchscreen (and/or display 102), from a sensor 106 included in the touchscreen, is less than or equal to a first distance 306A, 306B and equal to or greater than a second distance 308A, 308B. The method can include increasing haptic feedback 304 (504) based on determining that the measured distance 110 is less than or equal to the first distance 306A, 306B and equal to or greater than the second distance 308A, 308B. the increasing the haptic feedback 304 (504) can include, based on determining that the measured distance 110 of the object from the sensor 106 is less than or equal to the first distance 306A, 306B and equal to or greater than the second distance 308A, 308B, providing haptic feedback 304 as a function of the measured distance 110, the haptic feedback 304 being greater for smaller measured distances. The method can include determining that the measured distance 110 is less than the second distance 308A, 308B (506). The method can include decreasing the haptic feedback 304 (508). The decreasing the haptic feedback 304 (508) can include, in response to determining that the measured distance 110 is less than the second distance 308A, 308B, decreasing the haptic feedback 304.

In some examples, the providing and/or increasing haptic feedback can include providing a signal to an electrostatic array included in the touchscreen.

In some examples, the providing and/or increasing the haptic feedback can include causing actuators included in the touchscreen to generate vibration.

In some examples, a rate of change of the haptic feedback, as a function of the measured distance, can be greater when the measured distance is less than the second distance than when the measured distance is greater than the second distance.

In some examples, the sensor 106 can include a fingerprint sensor.

In some examples, the fingerprint sensor can include at least one of an ultrasonic sensor or an optical sensor.

In some examples, the determining the measured distance comprises determining, by a capacitive touch sensor included in the touchscreen, a location of the object on the touchscreen.

In some examples, the decreasing the haptic feedback can include stopping providing haptic feedback in response to determining that the measured distance is less than the second distance.

Figure 6:
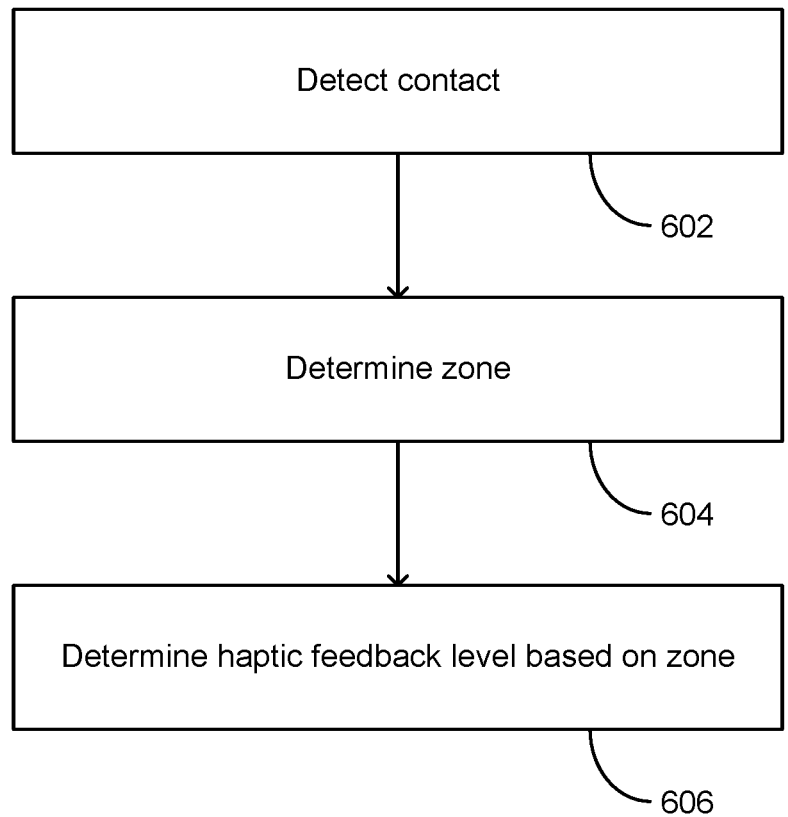
FIG. 6 is a flowchart showing a method performed by the computing device according to another example implementation.

FIG. 6 is a flowchart showing a method performed by the computing device 100 according to another example implementation. The method can include detecting a contact (602). The detecting a contact can include detecting a contact on a touchscreen, such as the display 102. The method can include determining a zone (604) of the contact. The determining the zone (604) can include, in response to detecting the contact on the touchscreen, determining whether the contact is located in a first zone on the touchscreen, a second zone on the touchscreen, a third zone on the touchscreen, or a fourth zone on the touchscreen, the first zone at least partially overlapping a fingerprint sensor included in the touchscreen, the second zone surrounding the first zone, the third zone surrounding the second zone, and the fourth zone surrounding the third zone. The method can include determining a haptic feedback level 304 based on the zone 112, 114, 116, 118. The determining the haptic feedback level 304 based on the zone 112, 114, 116, 118 can include determining a haptic feedback level to generate based on the determined location of the contact, the haptic feedback level being a first haptic feedback level when the contact is in the first zone 112, a second level when the contact is in the second zone 114, a third level when the contact is in the third zone 116, and a fourth level 118 when the contact is in the fourth zone, the second haptic feedback level being greater than the first haptic feedback level, the third haptic feedback level being less than the second haptic feedback level and greater than the first haptic feedback level, and the fourth haptic feedback level being less than the third haptic feedback level.

In some examples, the first zone is rectangular shaped, the second zone is rectangular shaped, the third zone is rectangular shaped, and the fourth zone is rectangular shaped.

In some examples, the method can further include providing no haptic feedback based on determining that the contact is located in the first zone on the touchscreen.

In some examples, the method can include providing no haptic feedback based on determining that the contact is located in the fourth zone on the touchscreen.

In some examples, the haptic feedback can include vibration.

In some examples, the haptic feedback comprises friction.

Figure 7:
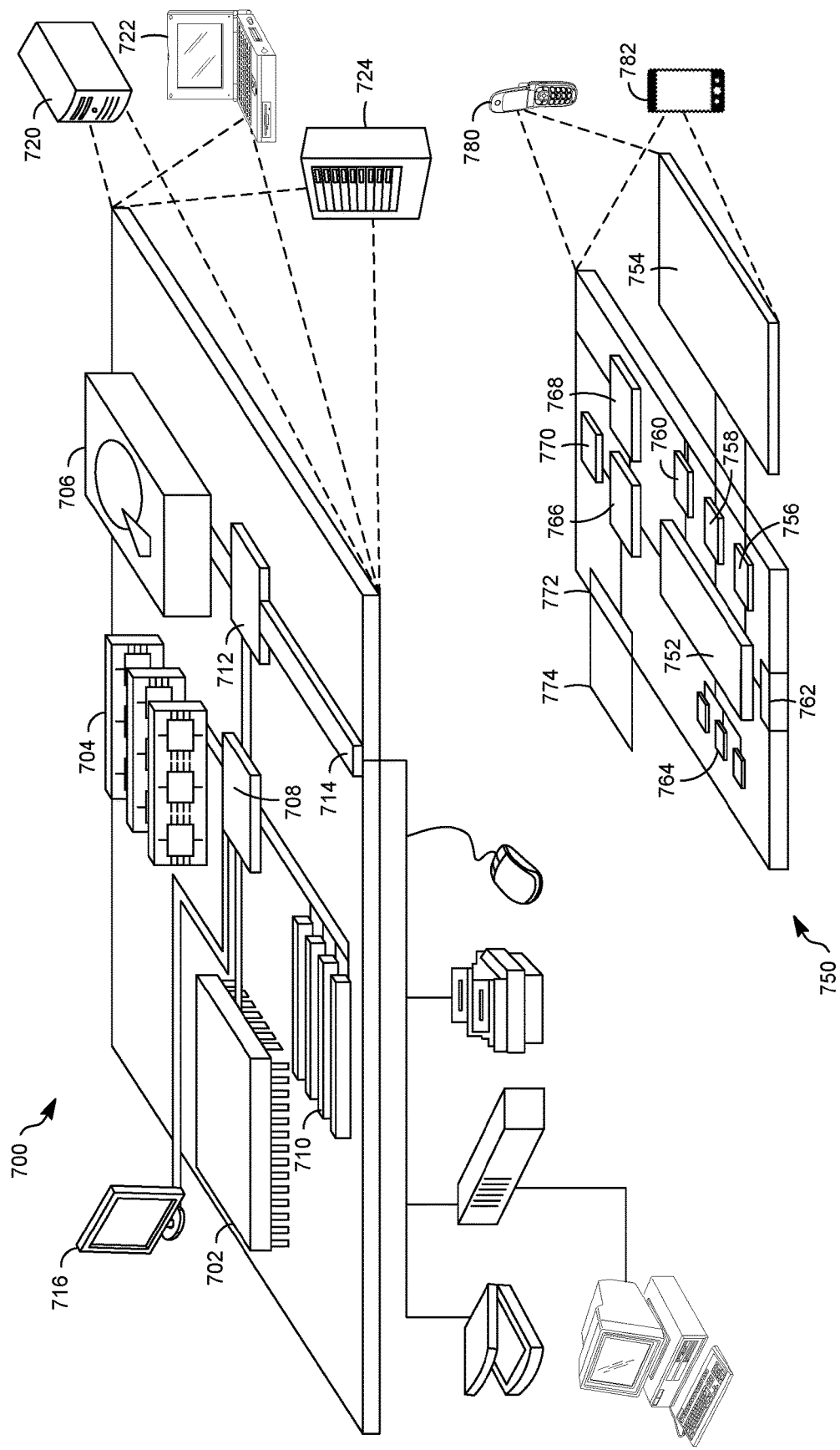
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

There follows a number of non-limiting exemplary implementations intended to aid understanding.

According to one example implementation, a method comprises determining, based on an indication of a position of a contact on a touchscreen, a distance of the contact from a sensor included in the touchscreen; and based on determining that the distance of the contact from the sensor is less than or equal to a first distance and equal to or greater than a second distance, providing haptic feedback as a function of the distance of the contact from the sensor. In response to determining that the measured distance is less than the second distance, the haptic feedback may be decreased.

For example, a haptic feedback of a first level may be provided when the distance is less than or equal to the first distance and equal to or greater than the second distance and may be decreased when the distance is less than the second distance. The decreasing the haptic feedback may comprise stopping providing haptic feedback in response to determining that the distance is less than the second distance.

Alternatively, more than one level of haptic feedback may be provided for distances less than or equal to the first distance and equal to or greater than the second distance. For example, providing haptic feedback as a function of distance may be such that the provided haptic feedback is greater for smaller distances of the contact from the sensor. Alternatively, the provided haptic feedback may be smaller for small distances of contact from the sensor. The change in haptic feedback may be continuous or step-wise.

The providing haptic feedback may comprise providing a signal to an electrostatic array included in the touchscreen. The providing the haptic feedback may comprise causing actuators included in the touchscreen to generate vibration.

A rate of change of the haptic feedback, as a function of the distance, may be greater when the measured distance is less than the second distance than when the distance is greater than the second distance.

The sensor may comprise a fingerprint sensor. The sensor may comprise at least one of an ultrasonic sensor or an optical sensor.

The determining the distance may comprises determining, by a capacitive touch sensor included in the touchscreen, a location of an object on the touchscreen.

Determining the distance of the contact from the sensor may comprise determining whether the contact is located in a first zone on the touchscreen or a second zone on the touchscreen, the first zone at least partially overlapping a fingerprint sensor included in the touchscreen and the second zone surrounding the first zone.

The haptic feedback may be provided at a first haptic feedback level when the contact is in the first zone and at a second level when the contact is in the second zone. The second haptic feedback level may be greater than the first haptic feedback level.

Determining the distance of the contact from the sensor may further comprise determining whether the contact is located in a third zone on the touchscreen, the third zone surrounding the second zone. Providing the haptic feedback as a function of the distance may comprises providing the haptic feedback at a third level when the contact is in the third zone. The third haptic feedback level may be less than the second haptic feedback level and greater than the first haptic feedback level. The method may comprise providing no haptic feedback based on determining that the contact is located in the third zone on the touchscreen.

Determining the distance of the contact from the sensor may further comprise determining whether the contact is located in a fourth zone on the touchscreen surrounding the third zone. Providing the haptic feedback as a function of the distance may comprises providing the haptic feedback at a fourth level when the contact is in the fourth zone. The fourth haptic feedback level may be less than the third haptic feedback level. The method may comprise providing no haptic feedback based on determining that the contact is located in the fourth zone on the touchscreen.

The zones may be of any appropriate shape. In some examples one or more of the first to fourth zones may rectangular shaped.

The method may comprises providing no haptic feedback based on determining that the contact is located in the first zone on the touchscreen.

The haptic feedback may comprise vibration and/or friction.

According to another example, a computing device comprises a display comprising a touch sensor layer, a fingerprint sensor, and a haptics layer; and a processor configured to perform any of the methods described herein.

The processor may be configured to provide haptic feedback by providing a signal to an electrostatic array included in the haptics layer to generate a frictional force. The processor may be configured to provide haptic feedback by causing actuators included in the haptics layer to generate vibration. The fingerprint sensor may comprise at least one of an ultrasonic sensor or an optical sensor. The processor may be configured to reduce the frictional force by causing the haptics layer to stop generating the frictional force. The processor may be configured to determine the distance of the contact from the sensor by determining, by a capacitive touch sensor included in the display, a location of the object on the display.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   determining, based on an indication of a position of a contact on a touchscreen, a distance of the contact from a sensor included in the touchscreen;
   based on determining that the distance of the contact from the sensor is less than or equal to a first distance and equal to or greater than a second distance, providing haptic feedback as a function of the distance of the contact from the sensor; and
   based on determining that the distance of the contact from the sensor is less than the second distance, decreasing the haptic feedback, wherein the decreasing the haptic feedback comprises stopping providing haptic feedback in response to determining that the distance is less than the second distance.

2. The method of claim 1, wherein the provided haptic feedback is greater for smaller distances of the contact from the sensor.

3. The method of claim 1, wherein the providing haptic feedback comprises providing a signal to an electrostatic array included in the touchscreen.

4. The method of claim 1, wherein the providing the haptic feedback comprises causing actuators included in the touchscreen to generate vibration.

5. The method of claim 1, wherein a rate of change of the haptic feedback, as a function of the distance, is greater when the determined distance of the contact from the sensor is less than the second distance than when the distance is greater than the second distance.

6. The method of claim 1, wherein the sensor comprises a fingerprint sensor.

7. The method of claim 6, wherein the fingerprint sensor comprises at least one of an ultrasonic sensor or an optical sensor.

8. The method of claim 1, wherein the determining the distance comprises determining, by a capacitive touch sensor included in the touchscreen, a location of an object on the touchscreen.

9. The method of claim 1, wherein:
   determining the distance of the contact from the sensor comprises determining whether the contact is located in a first zone on the touchscreen or a second zone on the touchscreen, the first zone at least partially overlapping a fingerprint sensor included in the touchscreen, the second zone surrounding the first zone; and
   the haptic feedback is provided at a first haptic feedback level when the contact is in the first zone and at a second haptic feedback level when the contact is in the second zone, the second haptic feedback level being greater than the first haptic feedback level.

10. The method of claim 9, wherein determining the distance of the contact from the sensor further comprises:
    determining whether the contact is located in a third zone on the touchscreen or a fourth zone on the touchscreen, third zone surrounding the second zone, and the fourth zone surrounding the third zone; and
    providing the haptic feedback as a function of the distance comprises providing the haptic feedback at a third haptic feedback level when the contact is in the third zone and at a fourth haptic feedback level when the contact is in the fourth zone, the third haptic feedback level being less than the second haptic feedback level and greater than the first haptic feedback level, and the fourth haptic feedback level being less than the third haptic feedback level.

11. The method of claim 10, wherein the first zone is rectangular shaped, the second zone is rectangular shaped, the third zone is rectangular shaped, and the fourth zone is rectangular shaped.

12. The method of claim 10, wherein the method comprises providing no haptic feedback based on determining that the contact is located in the fourth zone on the touchscreen.

13. The method of claim 9, wherein the method comprises providing no haptic feedback based on determining that the contact is located in the first zone on the touchscreen.

14. A computing device comprising:
    a display comprising a touch sensor layer, a fingerprint sensor, and a haptics layer; and
    a processor configured to claim cause the computing device to:
    determine, based on an indication of a position of a contact on a touchscreen included in the computing device, a distance of the contact from the fingerprint sensor;
    based on determining that the distance of the contact from the fingerprint sensor is less than or equal to a first distance and equal to or greater than a second distance, provide haptic feedback as a function of the distance of the contact from the fingerprint sensor; and
    based on determining that the distance of the contact from the fingerprint sensor is less than the second distance, stop the haptic feedback.

15. The computing device of claim 14, wherein the processor is configured to provide haptic feedback by providing a signal to an electrostatic array included in the haptics layer to generate a frictional force.

16. The computing device of claim 14, wherein the processor is configured to provide haptic feedback by causing actuators included in the haptics layer to generate vibration.

17. The computing device of claim 14, wherein the fingerprint sensor comprises at least one of an ultrasonic sensor or an optical sensor.

18. The computing device of claim 14, wherein the processor is configured to reduce a frictional force by causing the haptics layer to stop generating the frictional force providing the haptic feedback.

19. The computing device of claim 14, wherein the processor is configured to determine the distance of the contact from the fingerprint sensor by determining, by a capacitive touch sensor included in the display, a location of the contact on the display.

20. A method comprising:
    determining, based on an indication of a position of a contact on a touchscreen, a distance of the contact from a sensor included in the touchscreen;
    based on determining that the distance of the contact from the sensor is less than or equal to a first distance and equal to or greater than a second distance, providing haptic feedback as a function of the distance of the contact from the sensor; and
    based on determining that the distance of the contact from the sensor is less than the second distance, decreasing the haptic feedback, wherein:
    determining the distance of the contact from the sensor comprises determining whether the contact is located in a first zone on the touchscreen or a second zone on the touchscreen, the first zone at least partially overlapping a fingerprint sensor included in the touchscreen, the second zone surrounding the first zone; and the haptic feedback is provided at a first haptic feedback level when the contact is in the first zone and at a second haptic feedback level when the contact is in the second zone, the second haptic feedback level being greater than the first haptic feedback level.

\* \* \* \* \*